April 7, 1925.

Re. 16,038

W. F. GROENE

TURNING AND FACING LATHE

Original Filed March 1, 1920 4 Sheets-Sheet 1

Inventor
WILLIAM F. GROENE

By Walter F. Murray
Attorney

April 7, 1925.

Re. 16,038

W. F. GROENE

TURNING AND FACING LATHE

Original Filed March 1, 1920

4 Sheets-Sheet 2

Inventor
WILLIAM F. GROENE

By Walter A. Murray
Attorney

April 7, 1925.

Re. 16,038

W. F. GROENE

TURNING AND FACING LATHE

Original Filed March 1, 1920 4 Sheets-Sheet 3

Inventor
WILLIAM F. GROENE

By Walter A. Murray
Attorney

April 7, 1925.
Re. 16,038
W. F. GROENE
TURNING AND FACING LATHE
Original Filed March 1, 1920
4 Sheets-Sheet 4
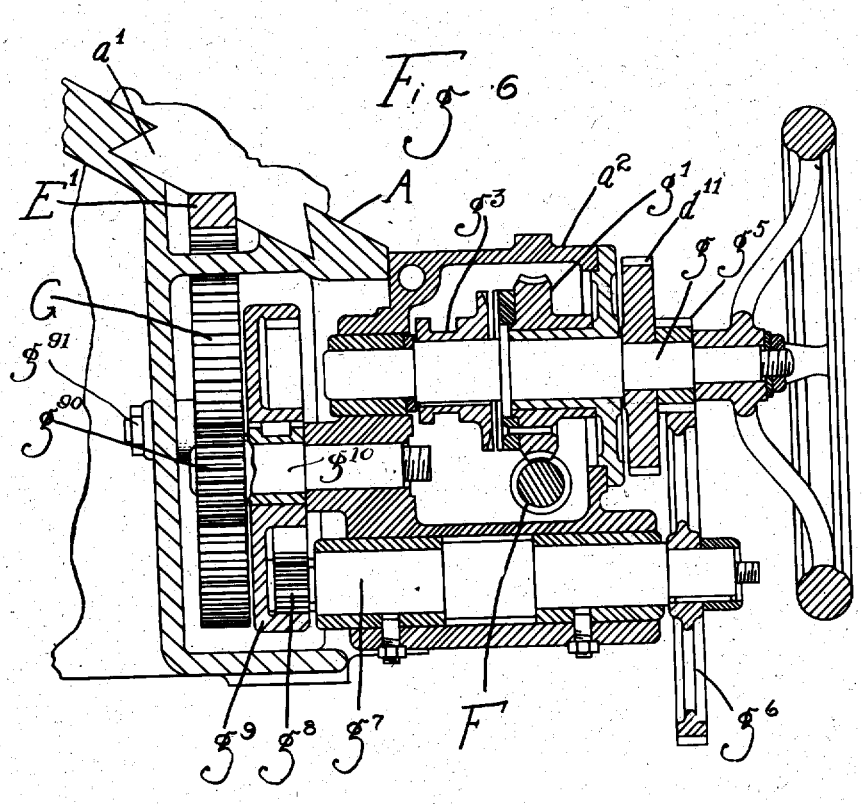
Inventor
WILLIAM F. GROENE
By Walter S. Murray
Attorney Reissued Apr. 7, 1925. Re. 16,038

UNITED STATES PATENT OFFICE.

WILLIAM F. GROENE, OF CINCINNATI, OHIO, ASSIGNOR, BY MESNE ASSIGNMENTS, TO THE R. K. LE BLOND MACHINE TOOL COMPANY, OF CINCINNATI, OHIO, A CORPORATION OF DELAWARE.

TURNING AND FACING LATHE.

Original No. 1,393,115, dated October 11, 1921, Serial No. 362,227, filed March 1, 1920. Application for reissue filed November 9, 1923. Serial No. 673,832.

*To all whom it may concern:*

Be it known that I, WILLIAM F. GROENE, a citizen of the United States, and a resident of the city of Cincinnati, in the county of Hamilton and State of Ohio, have invented certain new and useful Improvements in Turning and Facing Lathes, of which the following is a full, clear, and exact description.

An object of my invention is a lathe having a turning tool, a facing tool and automatic means for feeding the tools simultaneously.

Another object of my invention is a means for varying the relative rates of feed in a lathe of the aforesaid character.

Another object of my invention is an improved means for feeding the facing attachment of a lathe.

These and other objects are attained by the means described in the specification and illustrated in the accompanying drawings, in which—

Fig. 6 is a transverse sectional view taken upon line 6—6 of Fig. 4.

Figure 1:
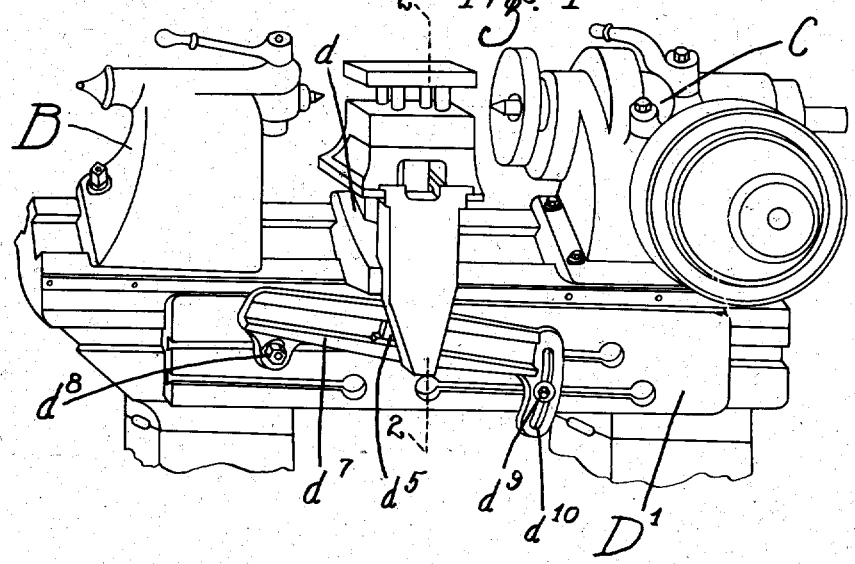
Fig. 1 is a perspective view, looking from the rear, of a lathe embodying my invention.
Figure 2:
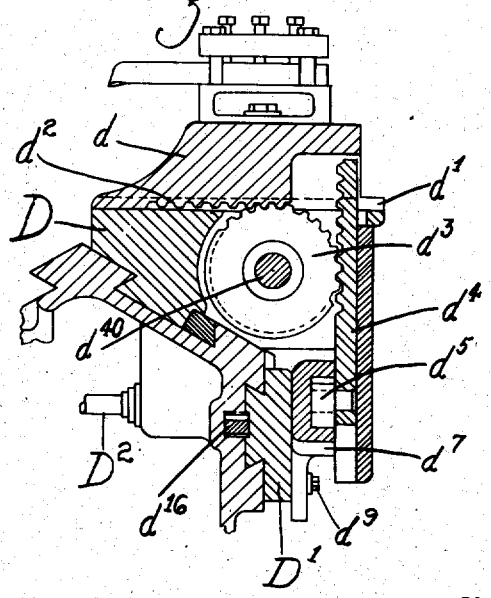
Fig. 2 is a sectional view taken upon line 2—2 of Fig. 1.

Referring to the parts. The lathe bed A has two dove-tailed ways $a$, $a'$, each of which is disposed at an angle to the horizontal. In way $a$ I mount the tail stock B, the head stock C, the carriage D, and a support $d$ for the facing tools $d'$. In way $a'$ I mount carriage E, upon which is mounted a support $e$ for turning tools $e'$. I provide means for conveying from the drive shaft F, longitudinal movement to the carriage E and simultaneously therewith a transverse movement of the facing tool support $d$, and means for varying the relative rate of movement of these parts.

The means for conveying movement from the drive shaft F to the carriage E, are as follows:—

Upon the front of lathe bed A is mounted a bracket $a^2$, in which is journaled a stud shaft $g$ which has mounted loosely upon it a worm wheel $g'$ which meshes with a worm upon the drive shaft F. Splined upon shaft $g$ is a cluth $g^3$ which may be moved by clutch lever $g^4$, (see Fig. 3), so as to fix the worm wheel $g'$ upon the shaft $g$. Shaft $g$ has fixed upon it a pinion $g^5$ which is in mesh with the gear wheel $g^6$, which is mounted upon a transverse shaft $g^7$, at the inner end of which is secured a pinion $g^8$ which meshes with the internal teeth upon the gear wheel $g^9$, which is secured upon a stud shaft $g^{10}$. The gear $g^9$ is keyed to the sleeve of a gear $g^{90}$ concentric with the gear $g^9$. The gear or pinion $g^{90}$ engages a bull wheel G which meshes with a rack E′ which is secured upon the carriage E. The bull wheel G is mounted upon a stud shaft $g^{90}$ carried by the lathe bed. The speed of the carriage E may be varied by changing the gear wheels $g^5$ and $g^6$.

Transverse reciprocation is imparted to the facing tool support $d$ as follows:—Support $d$ is mounted in transverse ways $d'$ upon carriage D, and has upon its under side a rack $d^2$, the teeth of which are engaged by a pinion $d^3$, which is mounted upon a longitudinal stud shaft $d^{40}$ which is secured in carriage D. Rotation is imparted to pinion $d^3$ by a vertical rack $d^4$ which is mounted in vertical ways upon the rear of carriage D and has vertical reciprocation imparted to it by means of a shoe $d^5$ which is seated in ways $d^6$ in guide $d^7$, which is mounted adjustably upon a carriage D′ which reciprocates in longitudinal ways $a^2$ upon the rear of the lathe bed A. Guide $d^7$ is mounted upon the carriage D′ by means of bolts $d^8$, $d^9$, whose heads are seated in dovetailed grooves in carriage D′. Bolt $d^9$ engages a grooved slot $d^{10}$ in one end of the guide $d^7$, so that the guide may be set at the angle desired by means of the bolt $d^9$ and the slot $d^{10}$. Motion is conveyed to the carriage D′ by the following mechanism. Shaft $g$ has secured upon it a gear wheel $d^{11}$ which meshes with the gear wheel $d^{12}$ which is secured upon the front end of a transverse shaft $D^2$, which is mounted in the lathe bed in journal bearings $d^{13}$, $d^{14}$, and carries at its rear end a gear pinion $d^{15}$, which meshes with a rack $d^{16}$ which is secured to the carriage D′. Various relative sizes of gears $d^{11}$ and $d^{12}$ may be mounted upon shafts $g$ and $D^2$, whereby changes in the relative speeds of reciprocation of the facing tool and the turning tool may be obtained without changing the angle of the guide bar, and by changes both of the angle of the angle bar and the sizes of said gears a great variety of feeds of said tools may be had.

In operation the slide $d^7$ is adjusted to and fixed at an angle which will give the proper relative speed of transverse reciprocation to the facing tool, in proportion to the feed of the turning tool. If the part of the work which is to be faced is of greater width than the part of the work which is to be turned, the reciprocation of the facing tool is made greater than that of the turning tool. The speed of the reciprocation of the facing tool is in direct proportion to the inclination of the guide $d^7$, that is the more the guide is inclined from the horizontal the faster the speed of the reciprocation of the facing tool, with the same ratio of size of the gear wheels $d^{11}$ and $d^{12}$.

Figure 3:
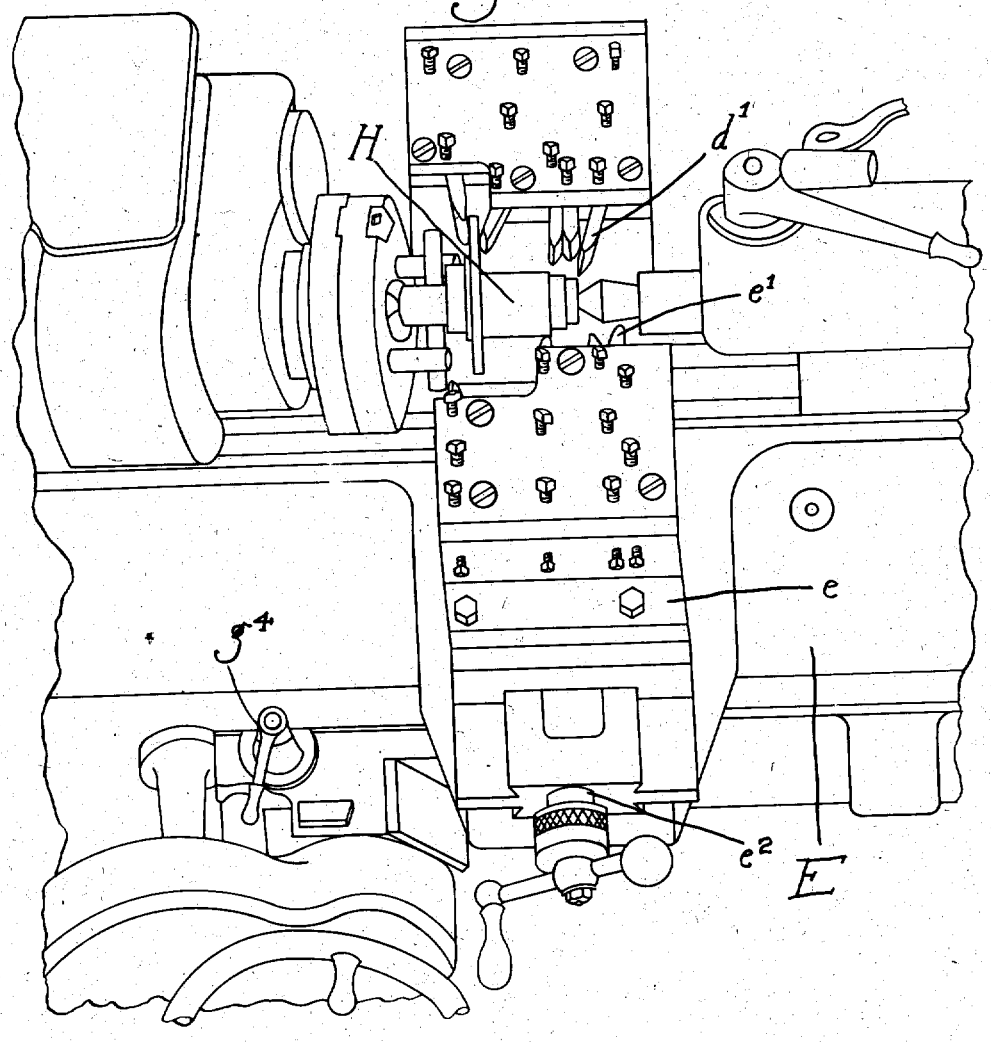
Fig. 3 is a perspective view of a part of the lathe bed, the head and tail stocks and the supports for the facing and turning tools, the view being taken from the front of the machine.
Figure 4:
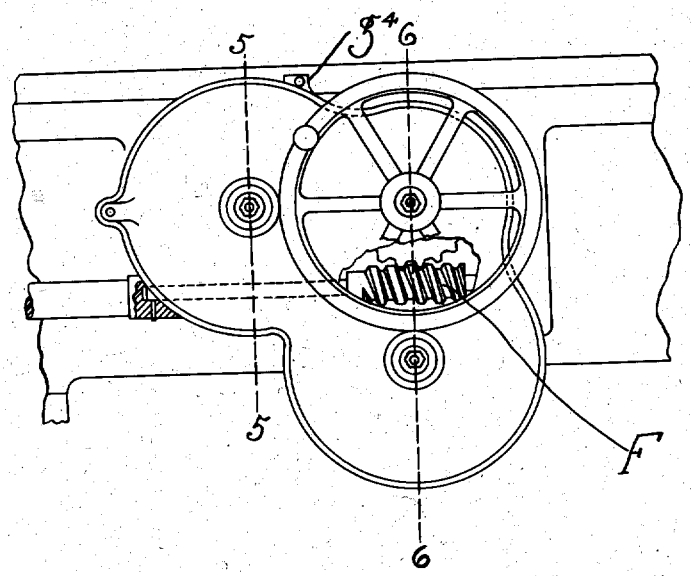
Fig. 4 is a detail front elevation of a part of the lathe bed and the drive shaft, the housings for the gear for transmitting motion thru the drive shaft to the shafts which drive the facing bar slide and the carriage to the turning tool, parts being broken away to disclose the parts in the rear of them.
Figure 5:
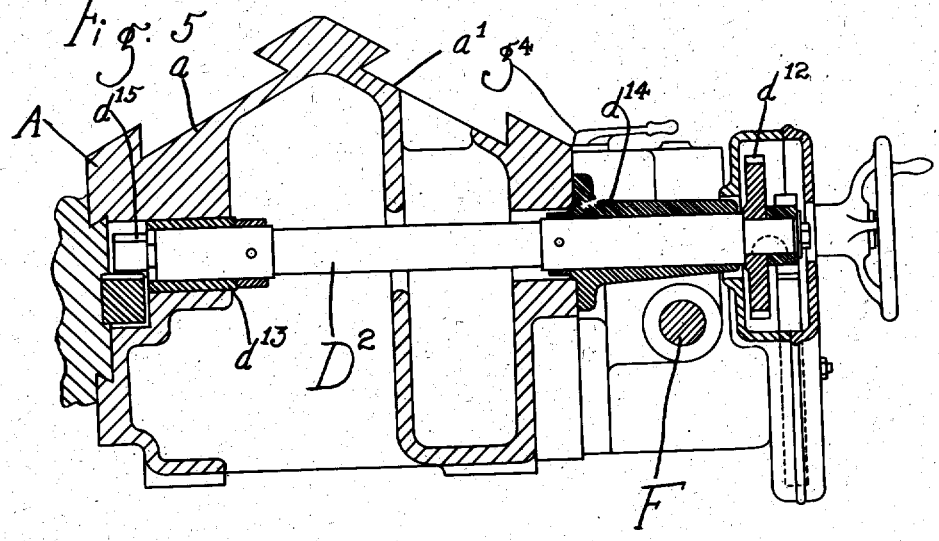
Fig. 5 is a transverse sectional view taken upon line 5—5 of Fig. 4.

The variations of the operations of the turning tool and the facing tool, which may be obtained by the relative feeding of the facing tool and the turning tool to the work, by means of their feed regulators, will be apparent to those skilled in the art, who will also appreciate that various turning and facing attachments may be carried on simultaneously by the mounting of various facing and turning tools upon the respective facing and turning support, as illustrated upon the work H in Fig. 3.

Having thus described my invention, what I claim is:

1. In a lathe the combination of a lathe bed having three sets of longitudinal ways, a carriage mounted in one of the ways, a turning tool support mounted upon the carriage, a facing tool carriage mounted in a second one of the ways and having a transverse way in it, a facing tool support mounted in the transverse way, means for imparting longitudinal movement to the first mentioned carriage and means for imparting transverse movement to the facing tool, comprising a carriage mounted in a third one of the ways, means for reciprocating said last mentioned carriage upon the lathe bed, an angularly adjustable slide mounted upon the last mentioned carriage, a shoe mounted upon the slide and means for transmitting the vertical movement of the shoe into a transverse movement of the facing tool support.

2. In a lathe of the character described the combination of a bed, a carriage, means adapted to mount the carriage reciprocally upon the bed, a guide mounted upon the carriage for providing a way capable of adjustment relative to the carriage, a tool support reciprocally mounted on the bed and having a rack upon its under side, a gear wheel engaging the rack, a vertically reciprocating rack engaging the gear wheel, and a shoe engaging the guide, movable through the way and the vertically reciprocating rack.

3. A lathe bed having two angular upper faces each with a longitudinal angular way therein, and upon its rear side a third longitudinal way, a head, a tail stock and a support for a facing tool support mounted in one of the angular ways, a carriage for a turning tool support mounted in the second angular way, a second carriage in the third way, a guide mounted adjustably upon the second carriage, a facing tool support, means connecting the guide and facing tool support and means for reciprocating the carriages in their ways.

4. A lathe bed having three longitudinal ways therein, a carriage mounted in one of the ways, a facing tool support mounted in a second of the ways, and a second carriage mounted in the third way, a guide mounted adjustably upon the second carriage, a shoe mounted on the facing tool support and engaging the guide, a rack upon the second carriage, a transverse shaft mounted on the bed, a gear on the transverse shaft engaging the rack upon the second carriage, a rack upon the first mentioned carriage, a drive shaft mounted upon the bed, a stud shaft mounted on the bed, driving means connecting the stud shaft and the drive shaft, a train of gears connecting the stud shaft and the rack on the first mentioned carriage, and a train of gears connecting the stud shaft and the transverse shaft.

5. In a lathe the combination of a lathe bed having two sets of longitudinal ways, a carriage mounted in one of the ways, a turning tool support mounted on the carriage, a drive shaft imparting longitudinal movement to said carriage, a transverse shaft mounted revolubly on the bed, a train of gears connecting the transverse shaft and the drive shaft, a carriage mounted in the second of the ways, a rack on the second mentioned carriage, a gear mounted on the transverse shaft engaging the rack, a facing tool carriage reciprocally mounted on the bed, a guide mounted upon the second mentioned carriage, and means engaging the guide and imparting movement to the facing tool support.

6. In a lathe the combination of a lathe bed having two sets of longitudinal ways, a carriage mounted in each of the ways, a turning tool support mounted on one of the carriages, a guide mounted adjustably upon the second carriage, a drive shaft mounted on the lathe bed, a transverse shaft mounted on the bed, means to transmit movement from the drive shaft to the transverse shaft, means to transmit motion from the drive shaft to the first carriage, means to transmit movement from the transverse shaft to the second carriage, a facing tool carriage mounted on the bed, a facing tool support mounted on the facing tool carriage, and means engaging the guide and imparting motion to the facing tool support.

7. A lathe bed having an upper face and a longitudinal way, a carriage mounted on the upper face of the lathe bed, a tool support reciprocally carried by the carriage and having a rack on its under face, a pinion carried by the carriage engaging the rack, a second carriage reciprocally mounted in the longitudinal way, a guide carried by the second carriage, a vertically reciprocating rack engaging the pinion and means associated with the vertical reciprocating rack and the guide for translating movement of the second carriage and guide carried thereby, into a vertical movement of the vertically reciprocating rack.

In testimony whereof, I have hereunto subscribed my name this 12th day of November, 1923.

WILLIAM F. GROENE.